3,014,063
3-AMINO-2,5-DICHLOROBENZOATES

Stanley R. McLane, Prospectville, John Russell Bishop, Hatfield, and Harvey P. Raman, Philadelphia, Pa., assignors to Amchem Products, Inc., Ambler, Pa., a corporation of Delaware
No Drawing. Filed Dec. 17, 1958, Ser. No. 780,926
6 Claims. (Cl. 260—471)

This application is a continuation-in-part of our copending application Serial No. 767,292 filed October 15, 1958.

This invention relates to new compositions of matter, and it more particularly relates to new compounds having herbicidal properties.

The present invention is exemplified by 3-amino-2,5-dichlorobenzoic acid and its functional derivatives having the general formula:

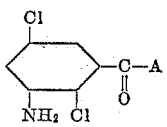

wherein A may be Cl, OH, OH.M, $NH_2$, OR or OX; M being either an amine selected from the group consisting of mono-, di-and tri-straight or branched chain alkyl amines of from 1 to 12 carbon atoms or an alkanol amine such as mono-, di- or tri-alkanol amine having from 2 to 9 total carbon atoms; where R is selected from the group consisting of (a) saturated straight or branched chain alkyl groups such as methyl, ethyl, propyl, butyl, octyl, nonyl and decyl, (b) diethylene glycol monoethyl ether groups (hereinafter referred to as Carbitol groups) and ethylene glycol monoethyl ether groups (hereinafter referred to as Cellosolve groups) such as, for example, ethyl and butyl Cellosolve, and (c) glycol and polyethylene glycol groups such as those of the polyglycol monoethers of the formula $R'(OC_nH_{2n})_mOH$, where R' represents an alkyl radical from 1 to 4 carbon atoms, n is an integer from 2 to 3 inclusive, and m is an integer from 1 to 3 inclusive; and X being either an ammonium radical or an alkali metal ion such as sodium or potassium.

The aforementioned acid as well as the aforementioned functional derivatives thereof, such as the alkali metal and ammonium salts and the amines and amides, have a highly desirable selective herbicidal activity.

Preparations of the 3-amino-2,5-dichlorobenzoic acid as well as some of the functional derivatives thereof are indicated by way of example in a non-limitative manner as follows:

EXAMPLE I 23.6 grams (0.1 mole) of pure 3-nitro-2,5-dichlorobenzoic acid (M.P. 220–221° C.) and 20 grams (0.169 mole) of granular tin are admixed in a flask to which is then added 100 milliliters of water and 100 milliliters of concentrated hydrochloric acid. The flask is then heated to 90°–100° C., this temperature being thereafter maintained until complete solution takes place (usually about 6 hours).

After complete solution has occurred, the entire solution is poured into a mixture of 1000 mls. of water and ice, whereby a crude precipitate is formed. This precipitate is collected and reslurried in 1000 mls. of water to remove any inorganic salt contaminants. The crude precipitate is then recrystallized from boiling water (solubility 6 grams/100 mls.) and dried in an oven at 100° C. A white crystalline product is recovered in about an 80% yield based upon the 3-nitro-2,5-dichlorobenzoic acid; this product being 3-amino-2,5-dichlorobenzoic acid.

The white crystalline product is analyzed as follows:

Melting point: 200–201° C.
Chlorine: Calculated percent—34.4; Found—34.4.
Nitrogen: Calculated percent—6.8; Found—6.73.
Solubility (gm./100 gm.@25° C.): water—0.0007; ethyl alcohol—17.28; i-propyl alcohol—12.69.

EXAMPLE II 20.6 grams (0.1 mole) 3-amino-2,5-dichlorobenzoic acid are dissolved in 100 mls. of methyl alcohol. This mixture is added to a solution containing 5.7 grams (0.1 mole) of 95% sodium methylate dissolved in 100 mls. of methanol. The mixture is then evaporated to 25 mls. on a steam bath. The resulting concentrate is cooled and the precipitated crude sodium salt is recovered by filtration. The crude salt is then purified by recrystallization from methyl alcohol and is then filtered and dried.

Solubility determinations on the sodium salt (based on gm./100 gm.@25° C.) were: water—15.75: ethyl alcohol—8.97; i-propyl alcohol—1.70.

EXAMPLE III

Amine salts of 3-amino-2,5-dichlorobenzoic acid may be prepared by simple admixture of the desired amine with the acid according to the following procedure:

10 grams of 3-amino-2,5-dichlorobenzoic acid is mixed with 10 mls. of water. 5.5 grams of 40% dimethylamine solution is added to this mixture with an accompanying slightly exothermic reaction. Complete solubility results within a few minutes. The mixture is then cooled in an ice bath and a white crystalline precipitate is recovered by filtration.

The amine salt of 3-amino-2,5-dichlorobenzoic acid prepared in the above manner has the following properties:

Melting point: 194–197° C. (decomposed).
Solubility (gm./100 gm.@25° C.): water—29.60; ethyl alcohol—6.90; i-propoyl alcohol—1.655.

EXAMPLE IV 20.6 grams (0.1 mole) of pure 3-amino-2,5-dichlorobenzoic acid M.P. 200–201° C.) are placed in a 125 ml. flask with a condenser. 37 grams (0.3 mole) of thionyl chloride are added and the mixture is refluxed on a steam bath for 6 hours. Excess thionyl chloride is removed by atmospheric distillation over a steam bath and complete removal is accomplished under reduced or subatmospheric pressure. The residue is crude 3-amino-2,5-dichlorobenzoyl chloride.

The preparation is illustrated by the following reaction:

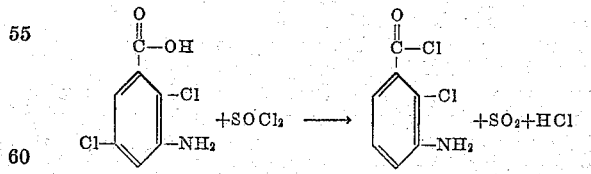

EXAMPLE V 200 mls. of toluene are added to the crude 3-amino-2,5-dichlorobenzoyl chloride obtained in the manner of Example IV. Anhydrous ammonia gas is sparged or sprayed for 30 minutes through the mixture at a temperature of 20–30° C. Thereafter, the reaction product is filtered to recover the precipitated crude product. The crude product is then washed with toluene and dried in an oven. It is then crystallized from boiling water.

The white crystalline product, 3-amino-2,5-dichlorobenzamide, which results from this process is analyzed as follows:

Melting point: 162–163° C.
Chlorine: Calculated percent—34.0; Found percent (Parr bomb)—34.0.
Solubility (gm./100 gm. @ 26° C.): water—0.32; ethyl alcohol—11.06; i-propyl alcohol—7.62.

The preparation of this 3-amino-2,5-dichlorobenzamide is a two-stage synthesis whereby the first stage comprises the reaction illustrated in Example IV and the second stage is as follows:

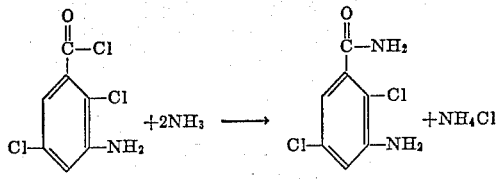

EXAMPLE VI

Preparation of the methyl ester of 3-amino-2,5-dichlorobenzoic acid is as follows:

51.5 grams (0.25 mol) of pure 3-amino-2,5-dichlorobenzoic acid (M.P. 200–201° C.) and 79 grams (2.46 mols) of methyl alcohol were admixed in a flask which was fitted with a reflux condenser. Five drops of concentrated sulfuric acid was added to serve as a catalyst for the esterification reaction. The reaction mixture was then heated to reflux (60–70° C.) and this temperature range was maintained for approximately 4 hours.

After the reflux cycle, the cold reaction mixture was poured into 1000 mls. of water with immediate precipitation of crystalline product. The solution was neutralized with a dilute sodium bicarbonate solution. After neutralization, the crystalline product was recovered by filtration and washed with water. The crystals were dried in an oven at 50° C. Recrystallization of the product was accomplished from mixed petroleum ethers.

The white crystalline solid resulting from the recrystalline procedure had a melting point of 58–60° C.

EXAMPLE VII

Preparation of the butyl ester of 3-amino-2,5-dichlorobenzoic acid is as follows:

51.5 grams (0.25 mol) of pure 3-amino-2,5-dichlorobenzoic acid (M.P. 200–201° C.) and 148 grams (2 mols) of butyl alcohol were admixed in a flask fitted with a reflux condenser and a water separator. One drop of concentrated sulfuric acid was added to serve as a catalyst for the esterification reaction. The reaction mixture was then heated to reflux (110–160° C.), this temperature being maintained with continuous water separation. After 4 hours of refluxing approximately 3.2 mls. of water had been separated from the esterification reaction.

A slight vacuum (40–60 mm.) was applied to the reaction flask to remove unreacted alcohol after which the crude reaction mixture was poured into 600 mls. of water. The organic (product) layer was recovered by extraction with ether. The ethereal layer was subsequently washed with dilute sodium bicarbonate solution, followed with washing by water. The crude solution was then dried over anhydrous sodium sulfate and the excess ether was evaporated on a steam bath.

The resulting crude product, the butyl ester of 3-amino-2,5-dichlorobenzoic acid, was a brown semi-solid material suitable for use as a herbicide without further purification.

EXAMPLE VIII

Preparation of the isooctyl ester of 3-amino-2,5-dichlorobenzoic acid is as follows:

51.5 grams (0.25 mol) of pure 3-amino-2,5-dichlorobenzoic acid (M.P. 200–201° C.) and 100 grams (1.3 mols) of a commercial grade of isooctyl alcohol were admixed in a flask which was fitted with water separator and a reflux condenser. One drop of concentrated sulfuric acid was added to serve as a catalyst for the esterification reaction. The reaction mixture was then heated to reflux (120–160° C.), this temperature being maintained with continuous water separation. After 2 hours of refluxing, approximately 3.8 mls. of water were recovered from the esterification reaction.

A slight vacuum (40–60 mm.) was applied to the reaction flask to remove unreacted alcohol, after which the crude esterification mixture was poured into a dilute sodium bicarbonate solution. After separation of the aqueous layer, the organic phase was extracted with ether. The ether layer was washed with water and dried over anhydrous sodium sulfate.

Following evaporation of excess ether, the residual organic phase was vacuum distilled with the fraction boiling from 210–240° C./4 mm. being recovered as the isooctyl ester of 3-amino-2,5-dichlorobenzoic acid.

The oily product analyzed as follows:

Specific gravity at 26° C_____ 1.168.
Refractive index at 26° C_____ 1.5360.
Chlorine percent: Calculated_____ 22.3.
Chlorine percent: Found_____ 21.2 (Parr bomb).

EXAMPLE IX

Preparation of the n-decyl ester of 3-amino-2,5-dichlorobenzoic acid is as follows:

103 grams (0.5 mol) of pure 3-amino-2,5-dichlorobenzoic acid (M.P. 200–201° C.) and 118 grams (0.75 mols) of n-decyl alcohol were admixed in a flask which was fitted with a water separator and a reflux condenser. The reaction mixture was then heated to reflux (230–240° C.), this temperature being maintained with continuous water separation. After 2 hours of refluxing, approximately 8 mls. of water were recovered from the esterification reaction.

The alcoholic reaction mixture was vacuum distilled with the fraction boiling from 257–259° C./8 mm. being recovered as the n-decyl ester of 3-amino-2,5-dichlorobenzoic acid.

The light yellow oily product analyzed as follows:

Specific gravity at 25° C_____ 1.1367.
Refractive index at 25° C_____ 1.5330.
Chlorine percent: calculated_____ 20.5.
Chlorine percent: found_____ 19.9 (Parr bomb).

EXAMPLE X

Preparation of the butyl Cellosolve ester of 3-amino-2,5-dichlorobenzoic acid is as follows:

51.5 grams (0.25 mol) of pure 3-amino-2,5-dichlorobenzoic acid (M.P. 200–201° C.) and 118 grams (1 mol) of butyl Cellosolve were admixed in a flask which was fitted with a water separator and a reflux condenser. Five drops of concentrated sulfuric acid were added to serve as a catalyst for the esterification reaction. The reaction mixture was heated to reflux (120–180° C.) and held at this temperature range with continuous water separation. After 4 hours of refluxing approximately 3.8 mls. of water had been recovered from the reaction.

Excess butyl Cellosolve was removed from the crude reaction product by distillation under a slight vacuum (40–60 mm.) after which the crude reaction product was poured into 600 mls. of water. The product was extracted with ether and the ether layer was subsequently washed with a dilute solution of sodium bicarbonate and with water. The ethereal solution was dried over anhydrous sodium sulfate and the ether was evaporated on a steam bath.

The residual organic phase was vacuum distilled with the fraction boiling at 280–300° C./4 mm. being recovered as the butyl Cellosolve ester of 3-amino-2,5-dichlorobenzoic acid. The liquid product had a specific gravity (25° C.) of 1.198 and a refractive index (25° C.) of 1.5364.

The following table illustrates the high degree of selective herbicidal activity of a 3-amino-2,5-dichlorobenzoic compound. This compound was applied in pre-emergence tests at the rate of 8 lbs./acre of acid equivalent. Visual observations were recorded 17 days after application:

*Table*

| Test Plant: | Visual observations using 3-amino-2,5-dichlorobenzoic acid |
|---|---|
| Wheat | No observable injury. |
| Corn | No observable injury. |
| Onion Sets | No observable injury. |
| Snapbeans | No injury to very slight injury. |
| Soybeans | No injury to very slight injury. |
| Wild Oats | Moderate injury. |
| Foxtail | Total kill. |
| Ryegrass | Severe injury. |
| Crabgrass | Total kill. |
| Johnson Grass | Severe injury. |
| Dock | Severe injury. |
| Mustard | Total kill. |
| Pigweed | Total kill. |
| Lambs Quarter | Total kill. |
| Chickweed | Total kill. |

The compounds of this invention may be applied as both pre- and post-emergence herbicides according to well established practices in the art.

What is claimed as the invention is:
1. A compound of the formula:

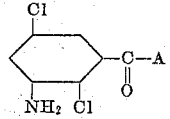

wherein A is a member of the group consisting of Cl, OH, OH.M, $NH_2$, OR and OX: M being an amine selected from the group consisting of straight and branched chain alkyl amines having from 1 to 12 carbon atoms; R being selected from the group consisting of saturated straight and branched chain alkyl groups having from 1 to 11 carbon atoms, glycol and polyethylene glycol groups, and glycol monoethers of the formula $$R'(OC_nH_{2n})_mOH$$

where R' represents an alkyl radical of from 1 to 4 carbon atoms, $n$ is an integer from 2 to 3 inclusive, and $m$ is an integer from 1 to 3 inclusive, and X being selected from the group consisting of ammonium ion, sodium ion and potassium ion.

2. Ethylene glycol monobutyl ether ester of 3-amino-2,5-dichlorobenzoic acid.

3. The sodium salt of 3-amino-2,5-dichlorobenzoic acid.

4. The potassium salt of 3-amino-2,5-dichlorobenzoic acid.

5. The ammonium salt of 3-amino-2,5-dichlorobenzoic acid.

6. 3-amino-2,5-dichlorobenzoic acid.

References Cited in the file of this patent

FOREIGN PATENTS 244,207     Germany     Mar. 1, 1912

OTHER REFERENCES

Beilstein: 14, 412 (1931).
Martin et al.: Biochem. J., 39, 91 (1945).
Thompson: Bot. Gaz., 107, 496 (1946).
Contrib. Boyce Thompson Inst., page 423 (1952).